June 20, 1944. O. J. POUPITCH 2,352,118
WASHER STRIP AND METHOD AND APPARATUS FOR PRODUCING SAME
Filed Feb. 16, 1942 2 Sheets-Sheet 1
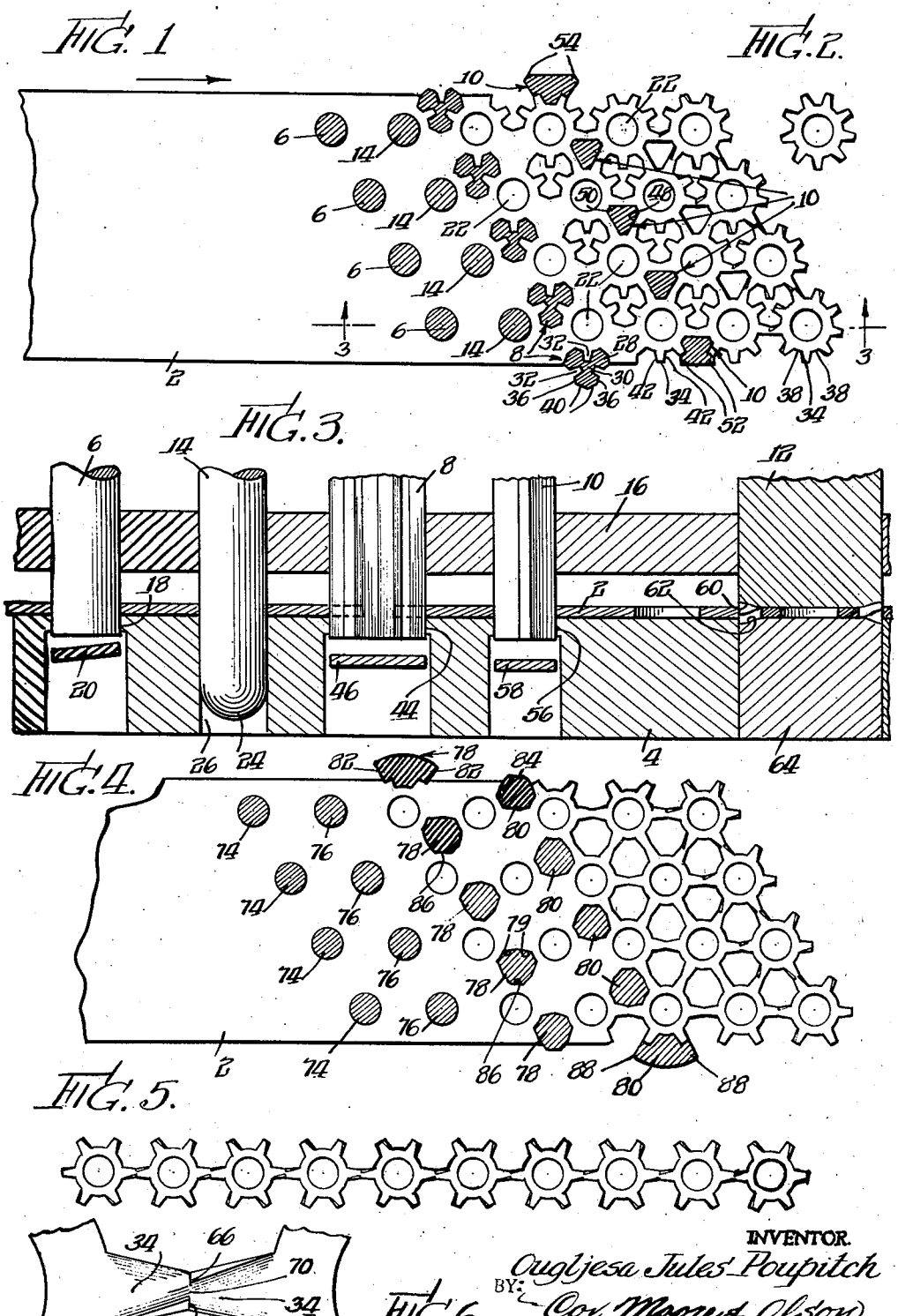
INVENTOR.
Ougljesa Jules Poupitch
BY: Cox Moore & Olson
attys.

June 20, 1944.   O. J. POUPITCH   2,352,118
WASHER STRIP AND METHOD AND APPARATUS FOR PRODUCING SAME
Filed Feb. 16, 1942   2 Sheets-Sheet 2
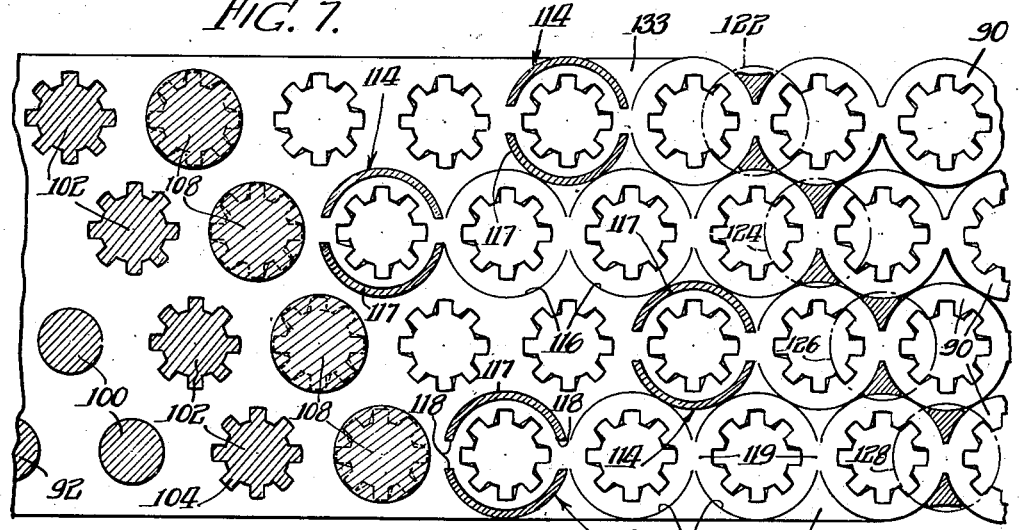
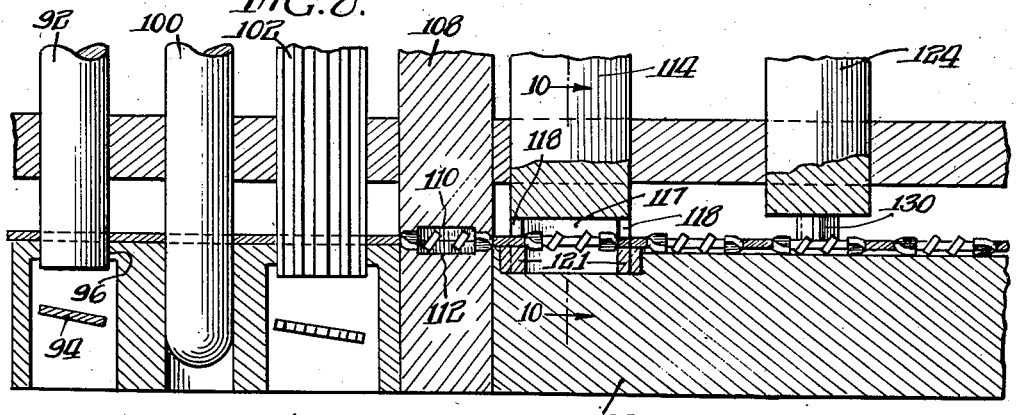
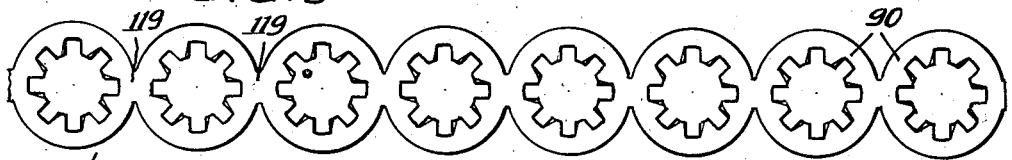
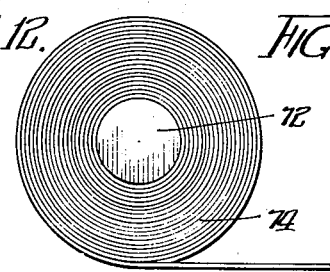
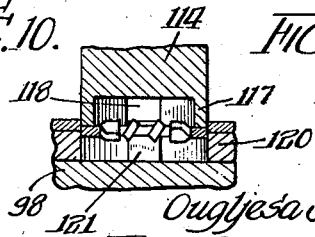
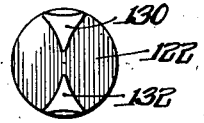
INVENTOR.
Ougljesa Jules Poupitch
By: Cox Moore & Olson attys.

Patented June 20, 1944

2,352,118

UNITED STATES PATENT OFFICE 2,352,118

WASHER STRIP AND METHOD AND APPARATUS FOR PRODUCING SAME

Ougljesa Jules Poupitch, Chicago, Ill., assignor to Illinois Tool Works, Chicago, Ill., a corporation of Illinois Application February 16, 1942, Serial No. 431,072

26 Claims. (Cl. 10—73)

This invention relates to a washer strip and to the method and apparatus for producing the same.

It is an object of this invention to provide, as a new article of manufacture, a strip of adjoined washers, particularly toothed lock washers or the like, readily severable for individual use or application.

It is another object of the invention to provide a method of, and apparatus for, making washers, particularly toothed lock washers, by which substantial savings in manufacturing costs may be effected, and the expense of hardening, packaging, handling, and applying washers substantially reduced.

In the production of lock washers, according to the present methods, the washers are formed from a strip of appropriate material by a stamping process wherein the central aperture and also, if desired, internal teeth are formed by die faces of the shape of the waste material to be removed, and the washer body and also, if desired, external teeth, are formed by die faces of the same shape as the washer.

In forming washers by this process, a strip of considerable waste material remains. It is, accordingly, an important object of my invention to provide a new and improved process of, and apparatus for, manufacturing washers by means of which a substantial reduction in the amount of such waste material may be effected while also providing masses, or strips, of washers wherein the washers are so homogenously arranged in the masses, or strips, that the hardening, packaging, and handling of the washers, the applying of the washers to the work, and the assembling of the washers with screws or the like may be facilitated; and the loss of washers in such operations substantially reduced or eliminated.

A further object of my invention is to provide a process of, and apparatus for, forming washers from a strip of washer material by removing therefrom only pieces of waste material, while leaving the washers thus formed joined in a strip but readily severable each from each, so that the washers may be hardened, packaged, handled, applied to the work, assembled with screws or the like, and sold, all in strip form.

Other and further objects and advantages of the invention will be apparent from the following description when taken in connection with the accompanying drawings, wherein—

Figure 1 is a plan view, partly in section, and diagrammatically illustrating a method and apparatus for forming a strip of washers, according to the present invention;

Figure 2 is a plan view of an individual washer produced by the process and apparatus diagrammatically illustrated in Figure 1;

Figure 3 is a fragmentary view in vertical section, illustrating diagrammatically the apparatus of Figure 1;

Figure 4 is a plan view, partly in section, and diagrammatically illustrating a modification of the apparatus of Figures 1 and 3 for forming a strip of lock washers, of which each washer has an even number of external teeth;

Figure 5 is a plan view of a single row of externally toothed washers in strip form, and which may be produced according to this invention;

Figure 6 is an enlarged, fragmentary plan view illustrating the readily severable attachment of the washers in a strip formed according to this invention;

Figure 7 is a plan view, partly in section, and diagrammatically illustrating a method and apparatus for producing internal toothed washers in strip form, according to this invention;

Figure 8 is a fragmentary view in vertical section through the washer strip and apparatus diagrammatically illustrated in Figure 7;

Figure 9 is a plan view of a single row of internal tooth washers in strip form, according to the present invention;

Figure 10 is a fragmentary view in vertical section along the line 10—10 of Figure 8;

Figure 11 is a bottom plan view of a punch or die forming part of the apparatus of Figures 7 and 8; and Figure 12 is a fragmentary view in elevation of a roll of washers, according to the present invention.

As shown in Figures 1 and 3, a strip 2 of washer material, usually metal, is fed intermittently by any suitable and appropriate mechanism (not shown) to a die block 4 supported upon the bed plate of a conventional punch press (not shown). As the strip 2 passes over the die block 4, it is operated upon by a plurality of sets of stamping dies 6, 8 and 10, a set of tooth twisting plungers 12, and a set of positioning or piloting plungers 14. The plungers 6 to 14 may be connected in any suitable known manner to the ram of the punch press for simultaneous actuation thereby, and may be slidably supported in and guided by a plate or bracket 16 having appropriate apertures therein, complementary in shape to the several plungers, and receiving these plungers.

Each set of plungers 6, 12 and 14 is composed of four members, while each set of plungers 8 and 10 is composed of five members. Only one of the plungers 12 of the tooth twisting set is shown in Figure 3, but it is to be understood that this set includes four such members. The plungers of each set are aligned transversely of the strip 2 and at an angle to side edges of the strip. The arranging of each set of plungers at an angle to the side edges of the strip makes it possible to utilize the full width of the strip, so that the strip of completed washers is of the same, or substantially the same, width as the original strip of washer material.

The dies or plungers 6 are cylinders or rods and are spaced equally across the strip. These dies cooperate with apertures 18 of equal diameter in the die block 4 to sever four identical discs 20 from the strip, thereby to form the central washer apertures 22.

The pilot plungers 14 comprise cylinders or rods equal in diameter to the die plungers 6, but longer than the plungers 6 and rounded at their lower ends as at 24 so as to be received in washer apertures 22 theretofore formed by the dies 6, thereby to accurately control and determine the position of the strip with respect to the stamping dies 6, 8 and 10 and the tooth twisting die 12. The plungers 14 are received in suitable openings 26 in the die block 4. It will be evident that the pilot plungers 14 serve as means for indexing the strip in its successive movements. The dies 8 may be referred to as clover leaf stamping dies, in view of their similarity in cross section to clover leaves. Specifically, each die 8 is formed to provide three wings 28 radiating from a central core 30 and spaced or separated by recesses 32 complementary in shape to the washer teeth 34. Each wing 28 is defined by opposed arcuate edges 36, corresponding to the arcuate edge 38 between adjacent washer teeth and substantially straight adjacent edges 40 corresponding to the opposed, generally radial, defining edges 42 of each washer tooth 34.

Each wing 28 of a die 8 may also be described as being composed of two integral sections, each of the same shape as the space between adjacent washer teeth. The clover leaf dies 8 cooperate with complementary apertures 44 in the die block 4 to punch from the strip pieces of waste material 46, which are, of course, of the same shape as the cross sectional shape of the dies 8.

The inner dies or plungers 10 may be referred to as triangular stamping dies, in view of the general similarity of the inner dies 10 to that geometric figure. The three inner dies 10 are identical in form, the die faces of each having three defining, substantially straight edges or faces 48 corresponding to the joined edge faces 42 of the washer teeth 34, the faces 48 being spaced from each other by concave faces 50 corresponding to the convex edge 38 between adjacent washer teeth 34.

The outermost dies 10 are of a different shape than the inner dies, the lower die 10, as shown in Figure 1, being provided with wings 52 for severing small pieces from the lower edge of the strip to form the ends of the inwardly facing but separate lower teeth of the lower row of washers. The top die 10, as shown in Figure 1, is provided with wings 54 for severing small pieces from the upper edge of the strip to form the free ends of adjacent upper washer teeth of the fourth row of washers. The dies 10 cooperate with similarly shaped openings 56 in the die block 4 to punch from the strip 2 correspondingly shaped pieces 58 of waste material.

The tooth twisting dies 12 may each be of conventional structure having a lower, raised and relieved surface 60 cooperating with the complementarily raised and relieved surface 62 in the die block 4, or in an insert 64 in the die block to twist the teeth about axes extending radially of the washer through the centers of the washer teeth. As best illustrated in Figure 6, the twisting of the washer teeth by the dies 12 serves to sever integrally united teeth of adjacent washers at their side edges as at 66 and 68, but leaves the teeth joined or integrally united at the small central area 70. This permits subsequent, ready severance or detachment of each washer from the adjacent washers to which it is joined or integrally united by toothed portions of the washers themselves. Thus, by the method and apparatus disclosed in Figures 1 and 3, the strip of material will be formed into a strip of washers comprising four rows, of which the washers of each row will be joined or integrally united with adjacent washers in the row and with adjacent washers of adjacent rows. From the forming dies, the strip of completed washers may be fed to a winding member 72 (Figure 10), by which the strip of washers is formed into a roll 74; or they may be fed to the roll after being passed through any suitable known hardening furnace or heating device, by which the washers are given the necessary heat treatment. The washers may, however, be left in flat strip form, hardened, and then sold in flat strips of any desired length.

Hardening the strip to the extent to which lock washers are ordinarily hardened has the effect of making the metal somewhat more brittle. This does not make the strips more difficult to handle as it does not prevent them from being rolled as shown in Fig. 12 and it permits the severance of individual washers by fracture of the connections.

Figure 4 illustrates diagrammatically the modification of the apparatus shown in Figures 1 and 3 for forming, in a strip, washers having an even number of external teeth, i. e., six external teeth. As shown in this figure, the central aperture of the washers is formed by a set of four dies or plungers 74 corresponding to the stamping dies 6. A set of four plungers 76 corresponding to the plungers 14 is received in the openings formed by the dies 74 and constitute means for indexing the successive movements of the strip. Sets of dies or plungers 78 and 80 form the external portions of the washers.

The set of dies 78 includes five members, of which the lower four shown in Figure 4 are identical in form, and are similar in shape to the die members 10. The flat or plane faces of the dies are, however, each composed of two angularly disposed portions 79, for the side edges of joined teeth of adjacent six tooth washers meet at a corresponding angle. Since the washers shown in Figure 4 are of the same size as the washers shown in Figure 1, but have three less external teeth, the material to be removed, in forming the adjoined washers, will be greater, and hence the die members 78 are larger than the die members 10.

The upper die member 78, as shown in Figure 4, is provided with wings 82 for forming the ends of the two upper teeth of each washer in the upper row of washers.

The four upper die members 80, as shown in Figure 4, are identical in form and dimension with the four lower die members 78. The four upper die members 80 are, however, faced in a different direction from the four lower die members 78, one concave surface 84 of each die member 80 facing upwardly, while a corresponding concave surface 86 of each of the four lower die members 78 faces downwardly. The lower die member 80 may be of the same form and dimension as the upper die member 78, being, therefore, provided with opposed wings 88, and severing, from the lower edge of the strip, small pieces of waste material to form the ends of the two lower teeth of each washer of the bottom row. A tooth twisting die, corresponding to the die 12 of Figure 3, will, of course, constitute part of the apparatus forming the washer strip shown in Figure 4. To facilitate the illustration of Figure 4, this tooth twisting die is not shown therein.

The stamping dies 74, 78 and 80, the pilot plungers 76 and the tooth twisting die for the washer shown in Figure 4 cooperate with a die block (not shown) corresponding to the die block 4 of Figure 3, the openings in such die block corresponding in form to the several dies or plungers.

The washer strip of Figure 5, which comprises a single row of washers, may be formed from the multiple strip of Figure 4 or directly from a narrow strip of washer material. In the first case a suitable shelf or support may be provided for a portion of the multiple row washer strip, while leaving the remaining portion unsupported, and a suitable impacting member or pad employed to strike or thrust upon the unsupported portion or row, thus severing one row of washers from another.

The single row washer strip may be formed from a relatively narrow strip of the original material, by employing a set of dies and plungers composed of one die member 74, one pilot plunger 76, two die members 78, one corresponding to the upper die member 78 of Figure 4, two die members 80, one corresponding to the lower die member 80 of Figure 4 and one tooth twisting die member.

It will be further evident that where the bed plate of the punch press or stamping machine is of sufficient size, each set of dies and plungers may include a plurality of members aligned in the direction of the strip so as to form a plurality of columns or transverse lines of washers at one time.

Figures 7 and 8 diagrammatically illustrate a method and apparatus which may be employed, according to the present invention, for forming strips of internally toothed lock washers 90. A set, consisting of a plurality of transversely aligned dies 92, may be employed to form the central apertures of the washers by punching therefrom a plurality of discs 94, the plungers 92 cooperating with openings 96 in a die block 98, across which the strip of material 2 is fed by any suitable and appropriate means (not shown). A plurality of transversely aligned pilot plungers 100 assure accurate registration of the strip with the various dies and plungers. The internal teeth of the washers may be formed by a plurality of transversely aligned dies or plungers 102 of complementary shape in cross section to the internal configuration of the washers. Thus the die members 102 may have a plurality of cutting teeth 104 radiating from a cylindrical core equal in diameter to the internal diameter of the washers.

Each die member 102 cooperates with an opening 106 in the die block 98, the openings 106 being of the same configuration as the internal configuration of the washers. A set of tooth twisting dies 108 is composed of a plurality of members aligned transversely of the strip parallel to the dies and plungers 100 and 102. Each of these tooth twisting die members is provided with an appropriately raised and relieved lower surface 110 cooperating with a complementary raised and relieved surface 112 of the die block 98, or of an insert in the die block, to twist the internal washer teeth formed by the corresponding tooth die or punch 102.

A set of punches or dies 114, which may be staggered or aligned transversely as required by their particular formations, are preferably arranged as shown in Figure 7, the punches for alternate rows being aligned parallel to the plungers 92, or 100, or 102, while the punches for adjacent rows are staggered by one washer space. These punches form partial washer bodies outlined by lines 116 in the strip concentric with the centers of the washers by depressing a major portion of each washer body below the plane of the strip, and, preferably, thereby severing the washers from the strip except for small attaching pieces. These indentations partially form the circular external peripheries of the washes, and, in effect, form in the strip knock-out areas defining the washers. Each die or punch 114 may comprise a plunger having a depending annulus 117 of an outer diameter equal to the external diameter of the washers and having diametrically opposed slots 118. The working edge portions of the annulus 117 are each somewhat less in arcuate extent than 180 degrees, so that the washer bodies are not completely depressed, but small, undepressed and uncut areas 119 are left between adjacent washers of each row. Preferably the spacing of the dies 114 is such that the peripheries of adjacent washers in each row and adjacent washers of adjacent rows are tangential, or substantially tangential one to another.

The annular working edge of each punch 114 cooperates with a specially formed and hardened ring 120 set in the upper face of the die block 98 to adequately support the strip beneath the punch, and each ring is provided with diametrically opposed, inwardly extending, radial projections 121 supporting the strip beneath the slots 118.

The final forming operation is performed by a set of dies or punches 122, 124, 126 and 128, preferably arranged as shown in Figure 7. These dies are identical and successively spaced, center to center, in a direction longitudinally of the strip a distance substantially equal to one-half the external diameter of the washers. Each die comprises a plunger having depending, diametrically opposed die members or punch projections 130 and 132, each provided with three part circular surfaces 133 of a diameter equal to the external diameter of the washers. These surfaces form, as shown in Figure 11, punch projections of triangular form in plan or horizontal section, the sides of the triangle being part circular and concentric to adjacent washers. The edges of the projections are preferably flattened slightly for strength. These die members punch out and remove pieces of waste material between adjacent washers in each row on opposite sides of the attaching areas 119. The attaching areas 119 being centrally undepressed and weakened by the depression of the washers, may be readily broken or severed subsequently to detach adjacent washers of each row.

The outer punch projection of each of the dies 122 and 128 may be enlarged, if desired or necessary, in conformance with the larger outer areas 133 between adjacent washers of the outer rows. This may be particularly advantageous in forming washers of the larger sizes.

By the method and apparatus illustrated in Figures 7 and 8, a plurality of strips of adjoined washers are formed. A single row strip of washers, as shown in Figure 9, may be formed from a multi-row strip or by feeding a narrow strip employing a set of dies and plungers composed of a one die member 92, one pilot plunger 100, one die member 102, one tooth twisting member

108, one punch 114 and one final die or punch as 122.

The composite strip or single strip (Figure 9) may be formed into a roll, as shown in Figure 12.

The composite strip or the single strip is hardened in the usual manner as in the case of the strips of externally toothed washers previously described.

While certain specific features of construction are disclosed herein, it will be apparent that changes may be made without departing from the spirit and scope of the appended claims.

Having thus described my invention, what I claim as new and desire to secure by Letters Patent is:

1. An article of manufacture comprising a row of externally toothed hardened metal washers joined by tooth portions permitting detachment of the washers from the row by fracture of the adjoining tooth portions.

2. An article of manufacture comprising a strip of aligned washers having external teeth, said washers being joined by the central portion between the opposed edges of oppositely twisted teeth of adjacent washers for detachment of the washers from the strip by severance of said joined central portions of teeth of adjacent washers.

3. An article of manufacture comprising a strip of washers arranged in a plurality of rows longitudinally of the strip, the washers of each row being joined to adjacent washers of the row and the adjacent rows by marginal portions of limited cross section for detachment of the rows and of the washers in each row by severance of said adjoining marginal portions of limited cross section.

4. A method of making externally toothed washers which comprises feeding a strip of washer stock longitudinally to a plurality of forming stations, at the first station successively removing from the strip stock discs of a diameter equal to the internal diameter of the washers, and at another station successively removing from the strip stock adjacent the openings formed at the first station pieces of waste material of such shape as to form part of the teeth of adjacently related washers, at another station removing from the strip stock adjacent the openings formed at the first two stations pieces of waste material in shape such as to form the remaining tooth portions of adjacent washers while leaving the washers adjoined by limited tooth areas.

5. A method of making washers which consists in feeding a strip of washer stock successively to a plurality of forming stations, at different ones of said stations successively removing from the stock pieces of waste material in form complementary to the internal form of the washers, and removing pieces of waste material forming a partial but not complete outline of the external form of the washers while leaving the washers adjoined by unremoved portions of limited cross section for subsequent severance to detach the washers from the strip, and deflecting tooth portions of the washers to form the desired locking tooth surfaces and to partially sever the adjoined teeth of adjacent washers.

6. A method of making internal tooth washers which consists in longitudinally feeding a strip of washer stock to a plurality of washer forming stations, at different ones of said stations successively removing pieces of waste material in shape complementary to the internal tooth form of the washers, forming spaced part circular incisions of a radius equal to the external radius of the washers, and removing pieces of waste material about and between the spaced incisions to complete the external forming of the washers while forming adjoining marginal connecting pieces of limited cross section between adjacent washers.

7. A machine for making washers from strip stock which comprises a cutting member for removing at spaced points pieces of waste material only to form the internal outlines of a plurality of washer elements, and a cutting member operable in such sequence to said first cutting member as to remove at spaced points between said internal outlines pieces of waste material only to form the external outlines of said plurality of washer elements, the last mentioned cutting member being so constructed as to form washer adjoining portions between external outlines of adjacent washers, which portions are of small area to facilitate detachment of an individual washer from an adjoined washer of the strip.

8. In a machine for making washers from strip stock fed successively to a plurality of forming stations, means at one of said stations for successively removing from the stock pieces of waste material in form complementary to the internal form of the washers, and means at another station for removing from the stock pieces of waste material in form corresponding to the partial but not complete outline of the external form of the washers, said second removing means being so constructed as to leave the washers adjoined by unremoved portions of limited cross section sufficiently conforming in shape to the external outlines of the washers to form, on subsequent severance, portions of individual washers completed as to form and of substantially uniform configuration.

9. A machine for making externally toothed washers from a strip of washer stock fed longitudinally to a plurality of forming stations, means at a first station for successively removing from the strip stock discs of a diameter equal to the internal diameter of the washers, means at a second station for successively removing from the strip stock adjacent the openings formed at the first station pieces of waste material of such shape as to form part of the teeth of adjacently related washers, and means at a third station for removing from the strip stock adjacent the openings formed at the first two stations pieces of waste material in shape such as to form the remaining tooth portions of adjacent washers, said last mentioned removing means being so constructed as to form limited areas adjoining teeth of adjacent washers.

10. A machine for making washers from strip stock fed longitudinally past a plurality of forming stations, means at the first of said stations for successively removing from the stock pieces of waste material in form complementary to the internal shape of the washers, means at a second station for removing pieces of waste material from the stock adjacent the openings formed at the first station to form a partial but not complete outline of the external shape of the washers, said second removing means being so constructed as to form adjoining portions of limited cross section between adjacent washers for subsequent severance to detach the washers from the strip, and means at a third station for twisting the teeth of the washers whereby to form locking tooth surfaces and to partially sever the adjoining teeth of adjacent washers.

11. In a machine for making internal tooth washers from a strip of washer stock fed longitudinally past a plurality of washer forming stations, means at one of said stations for removing pieces of waste material in form complementary to the internal tooth shape of the washers, means at another of said stations for forming spaced apart circular incisions of a radius equal to the external radius of the washers, and means at a third station for removing pieces of waste material about and between the spaced incisions to complete the external forming of the washers, said last mentioned removing means being so constructed as to form marginal connecting pieces of limited cross section between adjacent washers.

12. An apparatus for making washers in strip form comprising a plurality of movable, spaced stamping dies and stationary die means supporting a strip of washer stock for the action of said stamping dies, one of said stamping dies comprising a plunger of external shape complementary to the internal form of the washers, another of said stamping dies comprising a plunger of such external shape as to remove from the stock pieces of waste material complementary in form to certain tooth portions of adjacent washers, including merging side edges of certain end-to-end adjoined teeth, another stamping die comprising a plunger of such external shape as to remove from the stock pieces of waste material complementary in form to the remaining tooth portions of adjacent washers, including the opposite merging side edges of said end-to-end adjoined teeth.

13. An apparatus for making washers in strip form comprising a plurality of sets of movable, spaced stamping dies, and stationary die means supporting a strip of washer stock for the action of said stamping dies, one set of said stamping dies comprising a plurality of plungers aligned transversely of the strip stock when supported by said die means and at an acuate angle to the side edge of the strip stock, each of said plungers being of external shape complementary to the internal shape of the washers, a second set of said stamping dies comprising a plurality of plungers parallel to the plungers of the first set of stamping dies, each of the plungers of said second set of stamping dies of external shape corresponding to certain tooth portions of adjacent washers, including merging side edges of certain end-to-end adjoined teeth, and a third set of said stamping dies comprising a plurality of plungers parallel to the plungers of the first two sets of dies, each of the plungers of said third set being of external shape corresponding to the remaining tooth portions of adjacent washers including the opposite merging side edges of said end-to-end adjoined teeth.

14. A machine for making internal tooth washers in strip form which comprises a plurality of movable, spaced stamping and incising dies and stationary die means supporting a strip of washer stock for the action of said stamping and incising dies, one of said stamping dies comprising a cylindrical plunger for stamping from the strip discs of external diameter equal to the internal diameter of the washers between the ends of the internal teeth, another of said stamping dies comprising a plunger complementary in external shape to the outline of the internal teeth of the washers for removing from the stock pieces of waste material complementary in form to the internal tooth portions of the washers, other of said incising and stamping dies comprising plungers having circular incising and stamping edges for first forming part circular incisions about and spaced from the openings formed by the second mentioned stamping dies, and then removing from about and between the incisions pieces of waste material from the strip along the lines of said part circular incisions, the stamping edges of certain of said other dies being so formed as to leave marginal connecting portions of limited area between adjacent washers.

15. A method of making internal tooth washers which consists in longitudinally feeding a strip of washer stock to a plurality of washer forming stations, at different ones of said stations successively removing pieces of waste material in shape complementary to the internal tooth form of the washers, pressing, at spaced points, discs concentric to the teeth and of diameter equal to the outer diameter of the washers out of the plane of the strip, and removing unpressed pieces of waste material about and between the depressed discs to complete the washers while leaving adjoining, marginal connecting pieces of limited cross section between adjacent washers.

16. In a machine for making internal tooth washers from a strip of washer stock fed longitudinally past a plurality of washer forming stations, means at one of said stations for removing pieces of waste material in form complementary to the internal tooth shape of the washers, means at another of said stations for pressing, at spaced points, discs concentric to the teeth and of diameter equal to the outer diameter of the washers out of the plane of the strip, and means at a third station for removing unpressed pieces of waste material about and between the depressed discs to complete the washers, said last mentioned removing means being so constructed as to leave marginal connecting pieces of limited cross section between adjacent washers.

17. An article of manufacture including a plurality of annular washer elements, said elements having a marginal connection one with the other, said marginal connection being of limited cross sectional area to facilitate ultimate separation of individual washers, said washers being lock washers having external teeth, a tooth of one washer and a tooth of an adjacent washer providing the physical connection between said washers.

18. An article of manufacture comprising a strip of washers of which adjacent ones are secured to each other by readily severable marginally connecting parts of limited size which form when severed portions of individual washers completed as to form and of substantially uniform configuration.

19. The method of making washers which comprises feeding a strip of washer stock longitudinally, removing from predeterminedly spaced areas of the strip pieces of material to form the washer openings, removing from the strip between said openings other discrete pieces of material shaped to form substantially, but not completely, the external outlines of the washers, and forming between adjacent washers readily severable, marginally connecting portions of limited cross section and configurated to form on severance portions of individual washers completed as to form and of substantially uniform configuration.

20. Mechanism for producing washers from strip stock which comprises means for feeding a strip of washer stock longitudinally, a plurality of cutting tool elements positioned to act successively upon the strip of washer stock fed by said means, said tool elements being constructed and relatively disposed in such sequence as to remove from the strip stock portions of waste material spaced from each other and shaped to form a series of marginally connected washers each sufficiently formed to be completed by the mere shearing of its marginal connections to adjacent washers.

21. An article of manufacture comprising a plurality of hardened metal lock washers having internal teeth and substantially, but not completely, formed annular bodies marginally connected by readily fracturable portions shaped and dimensioned to form, on severance, portions of the annular bodies of individual lock washers completed as to form and of substantially uniform configuration.

22. A method of producing washers in strip form which consists in longitudinally feeding a strip of washer stock and successively removing substantially all portions of the washer stock other than that forming a series of substantiallly, but not completely, formed washer elements, adjacent ones of which have a marginal connection of limited cross-section and configuration to form, on subsequent severance of the connection, individual washers completed as to form and of substantially uniform configuration.

23. An article of manufacture comprising a strip of hardened metal washers of which adjacent ones are secured to each other by readily fracturable marginal connecting parts of limited size which form when fractured portions of individual washers completed as to form and of substantially uniform configuration.

24. An article of manufacture consisting of regularly spaced annuli connected by bars, the two halves of each bar being twisted in opposite directions to provide a weakened point of severance at the middle of each bar.

25. The method of making washers which comprises forming of strip material a plurality of regularly spaced annuli connected by bars, and twisting the two halves of each bar in opposite directions to provide a weakened point of severance at its middle.

26. The method of making externally toothed washers which provides forming of sheet material a plurality of regularly spaced annuli and external radial projections from each annulus, at least one projection of each annulus being integral with a projection of another annulus to form a bar connecting the annuli, twisting the projections from each annulus in such direction that the two halves of each connecting bar are twisted in opposite directions to provide a weakened point of severance at its middle.

OUGLJESA JULES POUPITCH.